United States Patent [19]

Taguchi et al.

[11] Patent Number: 5,052,099
[45] Date of Patent: Oct. 1, 1991

[54] METHOD OF FABRICATING A MAGNETIC HEAD BY SPUTTER ETCHING

[75] Inventors: Akira Taguchi; Shigetoshi Morita; Shunichi Taka; Hirohide Yamada; Yoshiaki Takada; Shinji Furuichi; Masahiro Ao, all of Mooka, Japan

[73] Assignee: Hitachi Metals, Ltd., Tokyo, Japan

[21] Appl. No.: 606,202

[22] Filed: Oct. 31, 1990

Related U.S. Application Data

[63] Continuation-in-part of Ser. No. 360,124, Jun. 1, 1989, Pat. No. 5,010,429.

[30] Foreign Application Priority Data

Dec. 3, 1987 [JP] Japan .................. 63-306651
Dec. 3, 1987 [JP] Japan .................. 63-306654
Nov. 22, 1988 [JP] Japan .................. 63-295652

[51] Int. Cl.$^5$ .............................. G11B 5/42
[52] U.S. Cl. .................. 29/603; 207/129.65; 360/122
[58] Field of Search ............... 29/603; 360/102, 143, 360/104, 122; 204/129.65, 129.1

[56] References Cited

U.S. PATENT DOCUMENTS

| | | | |
|---|---|---|---|
| 4,257,076 | 3/1981 | Shimizu et al. | 360/107 |
| 4,559,572 | 12/1985 | Kumasaka et al. | |
| 4,660,114 | 4/1987 | Yamakawa et al. | 360/122 |
| 4,709,284 | 11/1987 | Endo et al. | |
| 4,796,127 | 1/1989 | Wada et al. | |
| 4,833,556 | 5/1989 | Kosarko et al. | 360/102 |
| 4,851,942 | 7/1989 | Kumasaka et al. | |

FOREIGN PATENT DOCUMENTS 1133274 5/1989 Japan .................. 360/103

OTHER PUBLICATIONS

IBM Technical Disclosure Bulletin, vol. 20, No. 8, Jan., 1978, 2 pp.

Primary Examiner—Carl E. Hall

[57] ABSTRACT

A floating type magnetic head is made of a polycrystalline material. A surface to be opposed to a magnetic recording medium is undulated with lands and grooves having a height difference of 50 to 200 Å on an average and a repetition pitch of 5 to 20 microns on an average. The portions, in which the heights of the lands and the grooves abruptly change, extend along the boundaries of the polycrystals. The head surface opposed to the magnetic recording medium is sputter-etched to have the predetermined surface roughness.

14 Claims, 8 Drawing Sheets

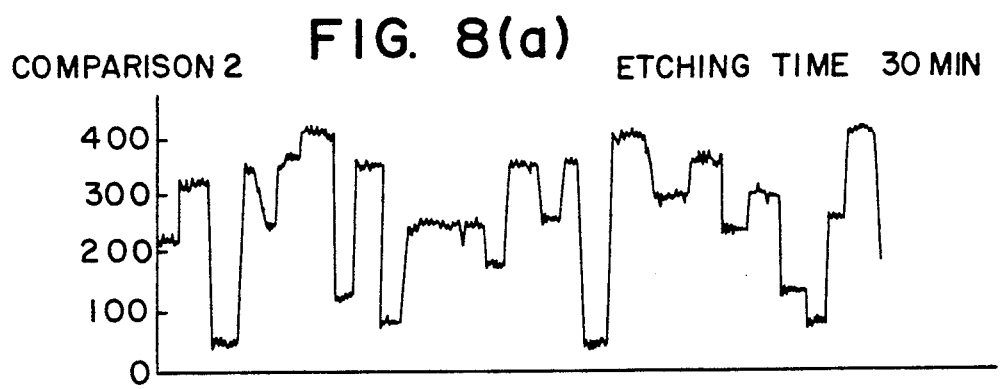
FIG. 8(a) COMPARISON 2 ETCHING TIME 30 MIN
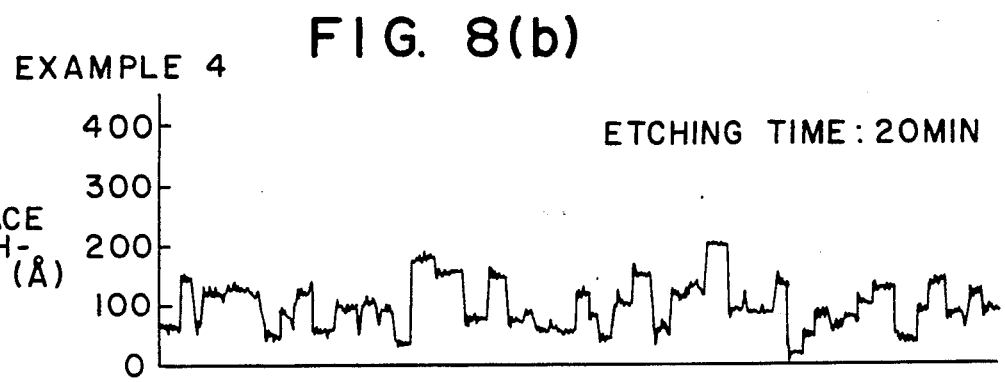
FIG. 8(b) EXAMPLE 4 ETCHING TIME: 20MIN
SURFACE ROUGHNESS (Å)
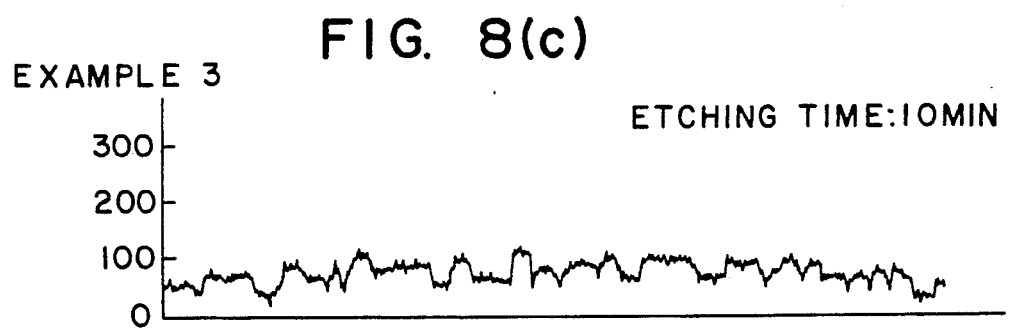
FIG. 8(c) EXAMPLE 3 ETCHING TIME: 10MIN
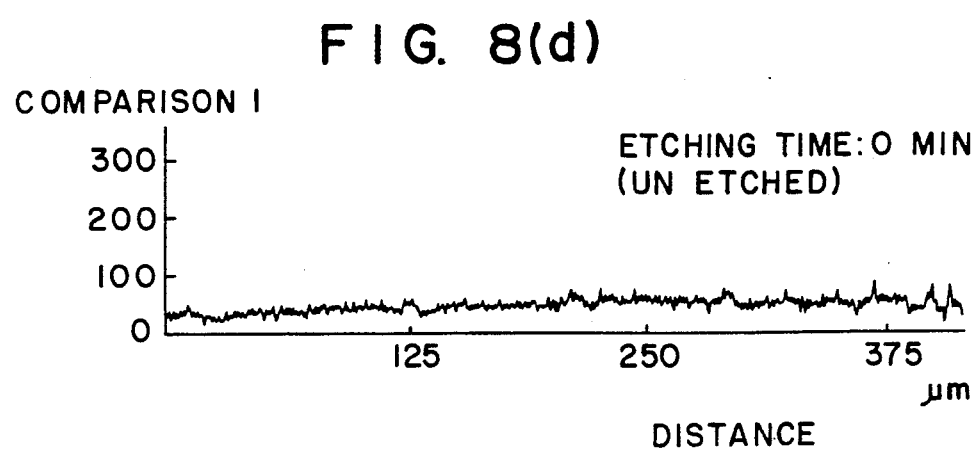
FIG. 8(d) COMPARISON 1 ETCHING TIME: 0 MIN (UN ETCHED)
DISTANCE μm x300

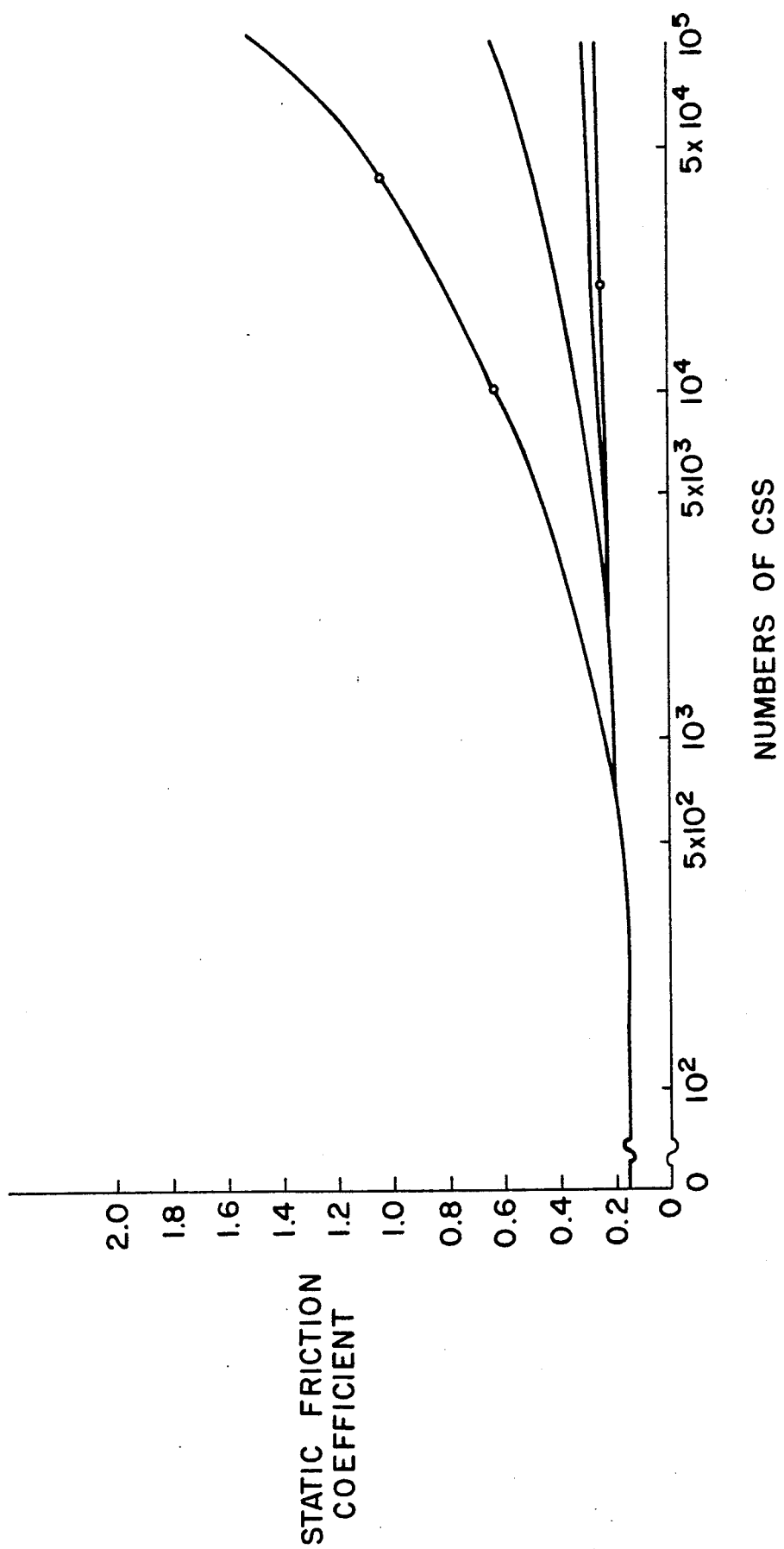

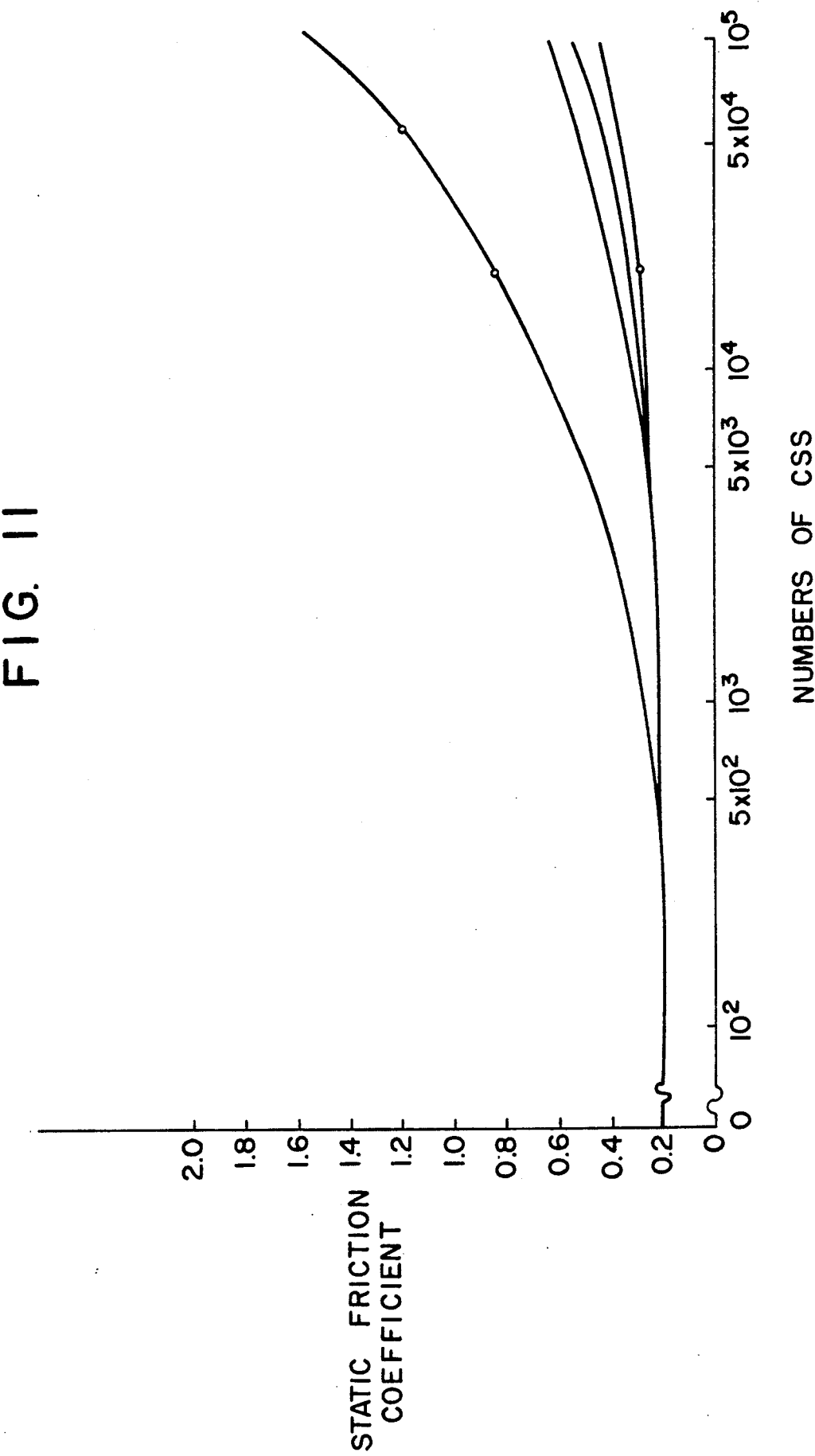

METHOD OF FABRICATING A MAGNETIC HEAD BY SPUTTER ETCHING

This is a divisional of copending application Ser. No. 07/360,124, filed on June 1, 1989, now U.S. Pat. No. 5,010429.

BACKGROUND OF THE INVENTION

1. Field of the Invention

The present invention relates to a magnetic head suitable for use in combination with a magnetic recording disk (or hard disk) and a process for fabricating the same. More particularly, the present invention relates to a floating-type magnetic head and a process for fabricating the same.

2. Related Art Statement

The floating-type heads are described in U.S. Pat. No. 4,709,284 and U.S. Pat. No. 4,559,572. At present, most of the hard disks are fabricated as magnetic recording mediums by applying magnetic powder of oxides to an aluminum alloy substrate. According to demand for the high recording density of recent years, however, a hard disk fabricated by plating or sputtering the substrate with a magnetic material comes into use. The magnetic disk becomes more small-sized and compact by using the plated or sputtered disk, and a drive source such as a motor for driving the disk becomes thinner and requires less torque.

The floating magnetic head constructed as described above is kept in light contact with the magnetic disk by the force of a spring, while the magnetic disk remains at rest. While the magnetic disk is rotating, the air near the surface of the magnetic disk is similarly moved to exert a force for lifting the lower surface of the slider. During the rotation of the magnetic disk, therefore, the magnetic head floats up and stays away from the magnetic disk.

When the rotation of the magnetic disk starts and stops, the magnetic head slides on the magnetic disk. As regards the condition of the contact to be established when the rotation of the magnetic disk is stopped, the flow of the air on the surface of the magnetic disk is slowed down gradually as the rotation of the magnetic disk is reduced. At the moment that the magnetic head is wholly derived of its buoyance, the magnetic head collides with the surface of the magnetic disk, rebounds thereon, and lands again on the surface of the disk. After repeating this series of motions several times, the magnetic head is brought to a stop as though it were dragged on the magnetic disk. The magnetic head is required to withstand these impacts exerted thereon during the start or stop of the rotations of the magnetic disk. This performance may be referred to hereinafter as the CSS (Contact-Start-Stop) resistance property.

The disk surface prepared by the aforementioned plating or sputtering method is finished to acquire a better facial accuracy than that of the applied type of the prior art. This causes a problem of sticking between the head and the disk surface, although the problem is not serious in the prior art. Specifically, as the facial accuracy of the surface facing the magnetic recording medium grows higher, the surface of the stationary disk and the opposed surface of the head will stick. If this sticking force between the head and the disk grows excessively strong, the life of the CSS resistance property of the device is shortened. The problem becomes serious especially for the device in which several disks are combined.

In order to solve that sticking phenomenon, a variety of treatments exist for making the surface of the head facing the disk coarse to some extent. However, none of them achieves sufficient effects.

SUMMARY OF THE INVENTION

An object of the present invention is to provide a magnetic head which has a small static friction coefficient with a disk and which is substantially free from damages on the disk and head surfaces even after the repeated CSS so that it can have a high durability.

Another object of the present invention is to provide a process for fabricating this magnetic head.

A further object of the present invention is to provide a magnetic head which can reduce not only a friction to be established between itself and the disk but also the size, weight and thickness of the disk device by an inexpensive, stable method.

A further object of the present invention is to provide a process for fabricating this magnetic head.

A further object of the present invention is to provide a floating-type magnetic head which can reduce a friction to be established between itself and a sputtered or plated disk, thereby increasing the CSS resistance property so that the hard disk device can be small in size, light-weight and thin.

A further object of the present invention is to provide a process for fabricating this magnetic head.

According to an aspect of the present invention, there is provided a floating-type magnetic head of a polycrystalline material, which comprises a surface facing a magnetic recording medium and roughed to form lands and grooves having an average height difference of 50 to 200 Å, an average repetition pitch of 5 to 20 microns, and their steep portions extending along the boundaries of crystals.

According to another aspect of the present invention, there is provided a floating-type magnetic head which comprises a surface facing a magnetic recording medium and composed mainly of lands having flat crests and grooves having flat bottoms.

According to a further aspect of the present invention, there is provided a floating-type magnetic head which comprises a surface facing a disk and finished to be wholly and partially undulated to have an average amplitude of 50 to 300 Å, as measured with a roughness curve using a contact needle type roughness meter.

These magnetic heads are fabricated by a process which comprises the step of finishing the surfaces of the magnetic heads facing the magnetic recording medium by a sputter etching to have a predetermined facial roughness.

According this process, during the sputter etching a layer having its properties changed may be removed, and the surface may be cleaned.

In this process, moreover, the surface facing the magnetic recording medium is masked except for its portion to be treated, so that only the portion outside the mask may be treated.

In this process using the mask, this mask may be removed during the sputter etching so that a step may be formed between the portion covered with the mask and the exposed portion.

BRIEF DESCRIPTION OF THE DRAWINGS

FIGS. 6, 7, 8, 10 and 11 are graphs presenting the individual results of measurement.

DESCRIPTION OF THE PREFERRED EMBODIMENTS

In the present invention, the magnetic head may be of a monolithic or composite type.

Figure 1:
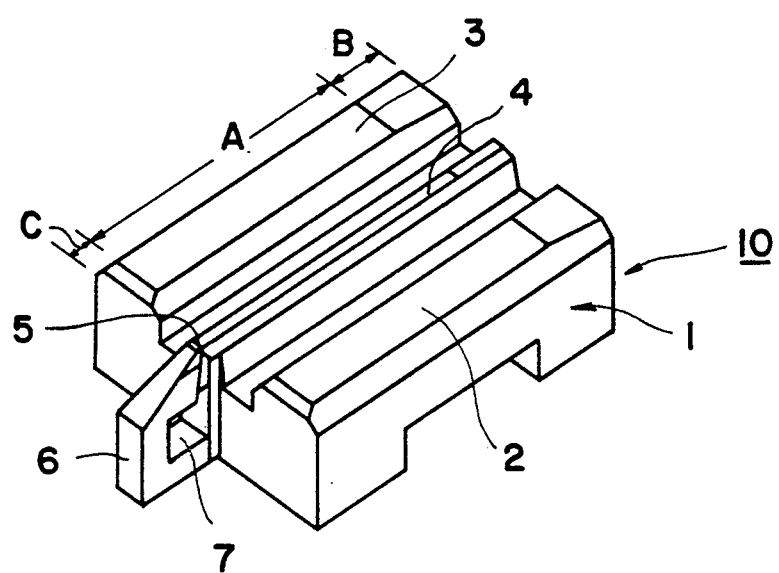
FIGS. 1, 2 and 3 are perspective views showing embodiments of floating-type magnetic heads according to the invention.

FIG. 1 is a perspective view showing one embodiment of a monolithic type magnetic head 10. A slider, designated by reference numeral 1, is formed with two ridges of main bearing surfaces 2 and 3 at its side portions. The slider 1 is further formed with a thin bearing surface 4 which extends in the form of a ridge in parallel with the main bearing surfaces 2 and 3. A core 6 is bonded to the read end portion of the bearing surface 4 through a magnetic gap 5. The bonded surfaces (i.e., front and back gaps) of the core 6 and the slider 1 may be formed with a thin film of an alloy having a high magnetic permeability. A winding is accomplished through a winding aperture 7 to provide a predetermined number of turns on the core 6.

Here, the magnetic alloy of high magnetic permeability may be suitably exemplified by an Fe-Al-Si alloy, usually referred to as "Sendust". An especially suitable magnetic alloy of Fe-Al-Si contains 2 to 10 wt. % of Al and 3 to 16 wt. % of Si, the remainder being substantially Fe. The most suitable one contains 4 to 8 wt. % of Al and 6 to 11 wt. % of Si, the remainder being substantially Fe. Incidentally, the magnetic alloy may suitably contain 2 wt. % or less of Ti or Ru because the corrosion and wear resistance can be improved. Similar effects can be obtained even if 4 wt. % or less of Cr is contained therein.

On the other hand, a magnetic alloy of highly magnetic permeability may also be exemplified by an amorphous alloy of Co-Nb-Zr (e.g., 70 to 90 at % of Co, 5 to 20 at % of Nb and 2 to 10 at % of Zr).

Figure 3:
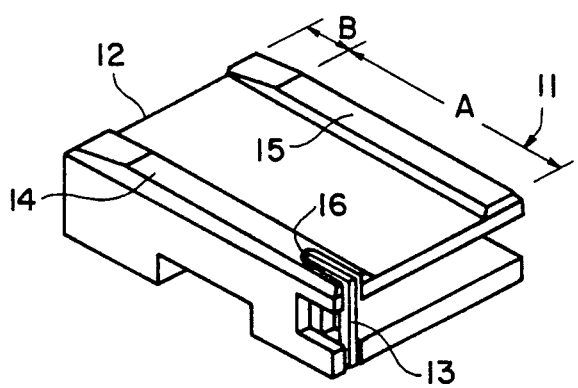

FIG. 3 is a perspective view showing one embodiment of a composite type magnetic head 11. Magnetic head 11 is composed of a slider 12 and a magnetic core 13 called the "chip". The slider 12 is made of a magnetic or nonmagnetic material. The core 13 is fixedly molded of glass in a slit 16 which is formed in one bearing surface 14 of two bearing surfaces 14 and 15 of the slider 12.

Figure 4:
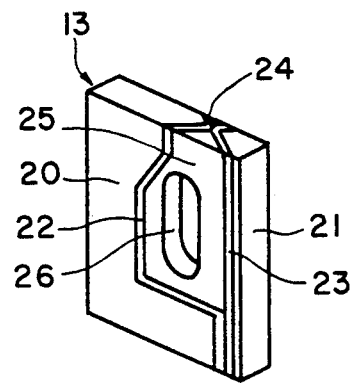
FIG. 4 is a perspective view showing a head chip for the embodiment of the magnetic head of FIG.

The detailed structure of one example of the core 13 is shown in FIG. 4. In FIG. 4, sputtered films 22 and 23 are formed over a C-shaped core 20 and an I-shaped core 21. These C-shaped core 20 and the I-shaped core 21 are glass-bonded to leave a gap 24. Numeral 25 designates the glass. Moreover, the I-shaped core 21 has a winding aperture 26 to provide a predetermined number of turns of a winding.

The aforementioned C-shaped core 20 or I-shaped core 21 may be suitably made of a polycrystalline magnetic ceramic material such as Mn-Zn ferrite, Ni-Zn ferrite or a Mn-Ni oxide ceramic material, of which the Mn-Zn ferrite is the most suitable. The composition of the suitable Mn-Zn ferrite may be exemplified by 25 to 37 mol % of MnO, 8 to 23 mol % of ZnO and 51 to 57 mol % of $Fe_2O_3$.

The aforementioned slider 1 or 12 may be suitably made of either: a polycrystalline magnetic ceramic material such as Mn-Zn ferrite, Ni-Zn ferrite or a Mn-Ni oxide ceramic material (of NaCl type); or a non-magnetic ceramic material such as calcium titanate, barium titanate, alumina or zinc ferrite. The slider 1 or 12 may naturally be made of a material other than the above-specified ones. Incidentally, the Mn-Ni oxide ceramic material may desirably be composed of 51 to 66 mol % of MnO, 34 to 49 mol % of NiO, and 1 to 15 mol % of one or two kinds of $Al_2O_3$, $ZrO_2$, CaO and $Y_2O_3$.

In the present invention, the aforementioned bearing surfaces 2, 3, 4, 14 and 15 are treated to have a predetermined facial roughness. While the head 10 or 11 is in its normal stop position, the bearing surfaces 2, 3, 4, 14 and 15 comes into actual contact with the disk in the stationary state in a region A (other than slopes B and C formed at the front and rear edges of the head), as shown in FIGS. 1 and 3. In the present invention, all of those regions A, B and C may be treated to have the aforementioned specific facial roughness, but normally only the region A is treated. Alternatively, only a major portion of the region A such as a region T, as dotted in FIG. 2, may be treated.

Figure 5:
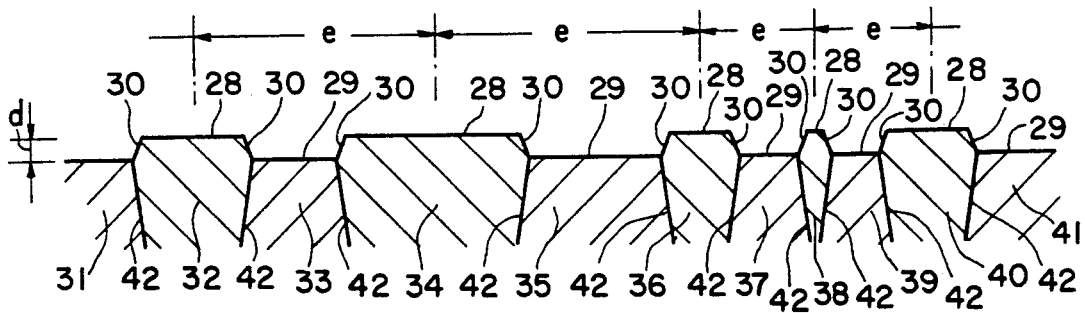
FIG. 5 is a sectional view showing a bearing surface of the magnetic head.

FIG. 5 is a schematic section showing the bearing surfaces of the head. In the bearing surfaces, as shown, there alternately appear lands 28 and grooves 29, between which there appear steep portions 30 having abrupt height changes. These steep portions 30 extend along the boundaries 42 of crystals 31 through 41. The height differences d between the lands 28 and the grooves 29 are within 50 to 300 Å, as measured by a roughness meter, and have an average value of 50 to 200 Å (preferably 70 to 170 Å). The repetition pitch e of the lands and grooves is 5 to 20 microns (preferably 7 to 17 microns).

The sticking phenomemon of the head and the disk is prevented or released by forming the suitable steps between the lands 28 and the grooves 29 and by repeating the steps at the suitable pitch. Moreover, the extensions of the steep portions 30 along the crystal boundaries 42 is thought to prevent the disk from CSS damage. Since the steep portions 30 extend along the crystal boundaries, more specifically, they are given a strength substantially similar to that of the single crystal particles so that no cracking will be caused even if the edges of the steep portions repeatedly (more than several ten thousands times) collide with the disk. The reason why the disk is not damaged is thought to come from the fact that no sharp portion or particle is formed as a result of cracking.

Since, in the present invention, the bearing surfaces are formed mainly of flat crests and flat bottoms, the head is reliably avoided from scratching the disk surface when the head lands or rebounds on the disk surface, so that the CSS resistance property can be improved.

The static friction coefficient $\mu_1$ between the disk and the head can be held at 1.0 or less, desirably at 0.7 or less. This static friction coefficient was determined by forcing the magnetic head onto the stationary magnetic disk by the force of about 8 g-f (7,840 dynes) to measure the force (or torque) required for starting the rotation of the magnetic head and by converting the measured force into the friction coefficient.

These bearing surfaces may be formed by a sputter etching, as will be described hereafter. In case the bearing surfaces are to be treated by sputter etching, a floating-type magnetic head can achieve the objects of the present invention, if it is finished such that the whole or partial portions of the bearing surfaces are undulated to have an amplitude of 50 to 300 Å, as measured by a roughness curve using a contact needle type roughness meter.

The sputter etching is a method for roughing the surface of the magnetic head opposed to the disk by means of a sputtering apparatus. The ordinary sputtering method is accomplished by ionizing inert gases such as Ar (argon) gases under a high voltage so that the surface of a target (i.e., substrate) may be bombarded with the Ar ions to stick the target particles to the other portions of the substrate, thereby forming a film thereon. In the sputter etching, on the other hand, the magnetic head surface is bombarded with the ionized inert gases to etch the atoms on the head surface. Here, the head is made of a polycrystalline material composed of fine crystals. The individual crystal particles composing the head have different planar orientations so that the head surface is etched as it is bombarded with the ionized gases. Because of the difference of the planar orientations, the atomic bonding energies are different in the individual crystal directions so that the energies required for etching the surface are different. In this etching process, the amounts of the crystal particles to be etched are different so that fine steps are formed among the individual particles. This sputter etching is an atomic treatment for controlling the sizes of steps from finer to relatively larger ones according to the etching time. Incidentally, during the sputter etching, the treated layers are removed from the surface being cleaned. For the sputter etching, moreover, unnecessary portions are masked so that only the necessary portions may be sputter-etched.

EXAMPLE 1

The monolithic type magnetic head shown in the perspective view of FIG. 1 was made of Mn-Zn polycrystalline ferrite containing 31 mol % of MnO, 16 mol % of ZnO and 53 mol % of $Fe_2O_3$. The surface of the head to be opposed to the disk was mirror-polished to have a surface roughness of 10 to 40 Å by means of a wet lap using fine grinding particles of diamond.

The surface of this monolithic type magnetic head to be opposed to the disk was sputter-etched with Ar gases under a pressure of 0.44 to 0.48 Pa by means of an etching apparatus of an R-F type, in which the turntable had a diameter of 42 cm and a making power of 0.5 KW.

Figure 2:
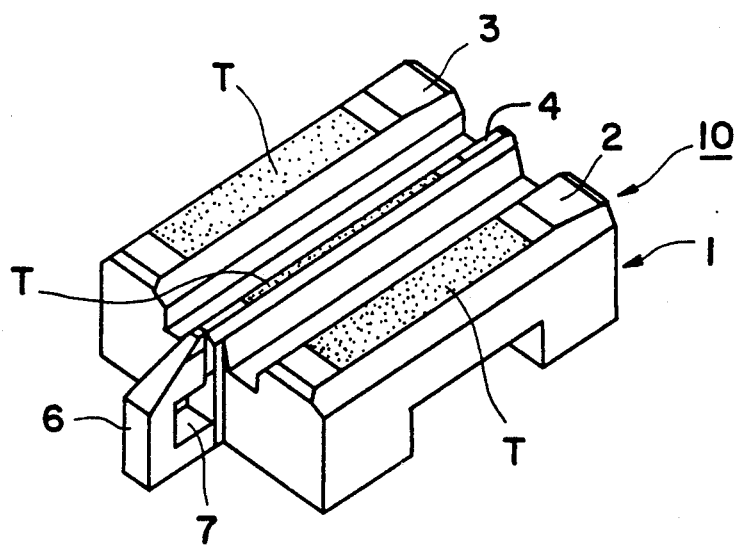
Figure 6:
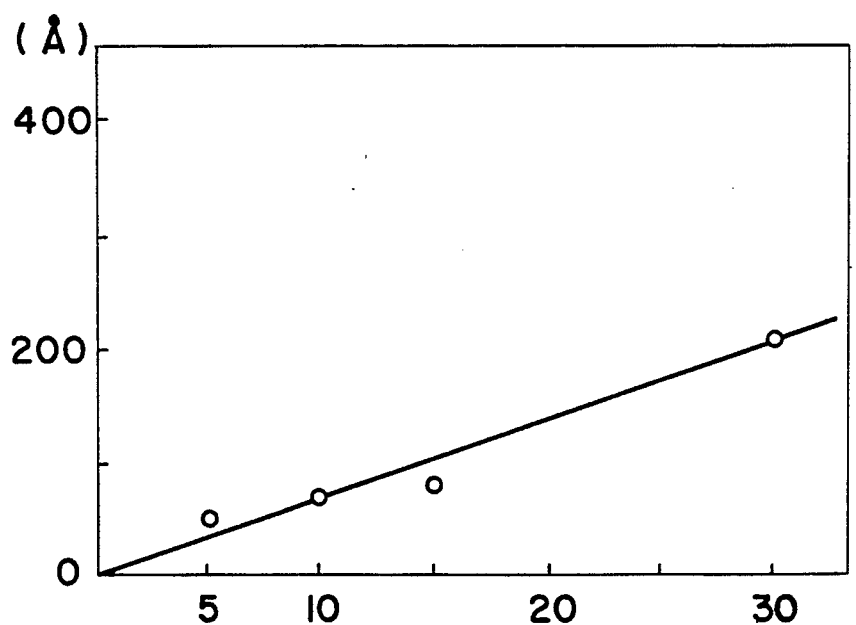

FIG. 6 is a graph plotting the relation between the sputter etching time and the surface roughness. Although this relation depends upon the making power, the kind, composition and pressure of the inert gases, the roughness changes substantially in proportion to the time with a varying gradient. The etching amount of the surface at this time is also plotted in FIG. 6. Since the head surface was masked to have a thickness more than that to be etched, it was not wholly removed but partially left at its portions unmasked so that a head having a partial contact with the disk could be fabricated, as shown in FIG. 2. Moreover, the slider surface could be prevented from direct contact with the disk by removing the mask in the course of the sputter etching to enlarge the steps of the slider surface opposed to the disk while reducing the remaining opposed surface, thereby forming other steps in-between.

Figure 7:
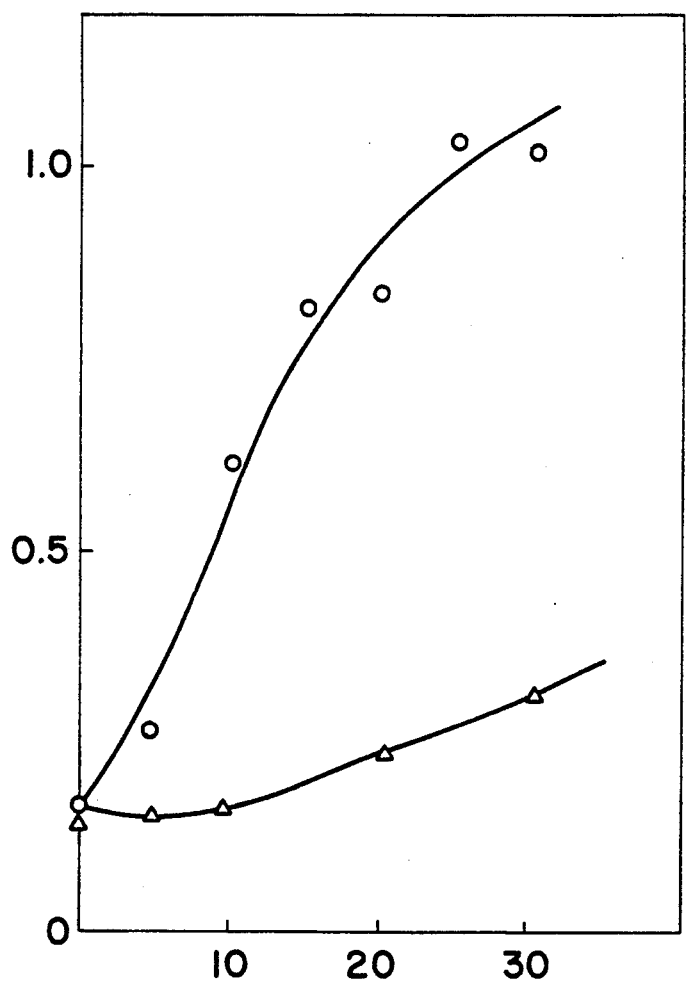

FIG. 7 is a graph plotting the changes in the static frictional force, which was established between the disk and the head when the steps between the lands and grooves of the head were changed, against the number of repetitions of the CSS. In the prior art using the wet lap technique, the frictional force was increased with the repetition number of the CSS and was found to jump from about ten thousands times. In the head having the lands and grooves of the present invention, on the contrary, the increase in the frictional force was acceptable. This implies that the resultant effect will be the better for the rougher steps of the head surface opposed to the disk. If, however, this surface is excessively roughed, there arises a problem that the head and the disk will be damaged. Therefore, the difference between the lands and the grooves for causing no damage will determine the upper limit.

EXAMPLE 2

The floating-type magnetic head used was mirror-finished to 10 to 40 Å. This magnetic head was set in position on the turntable (having a diameter of 42 cm) of the same R-F magnetron type sputter apparatus. The surface of the magnetic head to be opposed to the disk was treated with a making power of 0.3 to 1.0 KW, under an Ar gas pressure of 0.4 to 0.5 Pa and for a sputter etching time of 10 to 60 mins. The floating type magnetic head thus fabricated according to the present invention is shown in FIG. 2. Here, the dotted portion shown in FIG. 2 is that treated by the sputter etching, and the remaining portion was masked and left untreated. The CSS resistance properties of the sputtered disk and the plated disk were measured to confirm that the static friction coefficient $\mu_1$ could be held at 0.7 or less even for the repetition number of the CSS of thirty thousands or more, if the difference between the lands and the grooves was 50 to 300 Å (or 50 to 200 Å on an average), so that both the sputtered and plated disks were not crushed.

EXAMPLES 3 AND 4 AND COMPARISONS 1 AND-2

The sputter etching time of the Example 1 was set at 0 mins (for Comparison 1), 10 mins (for Example 3), 20 mins (Example 4) and 30 mins (for Comparison 2). The surface roughness curves obtained of the bearing surfaces are shown in FIGS. 8(a)-(d). The depth d and pitch e (as defined with reference to FIG. 5) of these cases are enumerated in the following Table:

| No. | $d_{max}$ (Å) | e (microns) |
| --- | --- | --- |
| Comparison 1 | 30 | 3 to 10 |
| Example 3 | 100 | 5 to 20 |
| Example 4 | 180 | 5 to 20 |
| Comparison 2 | 350 | 5 to 20 |

Figure 9:
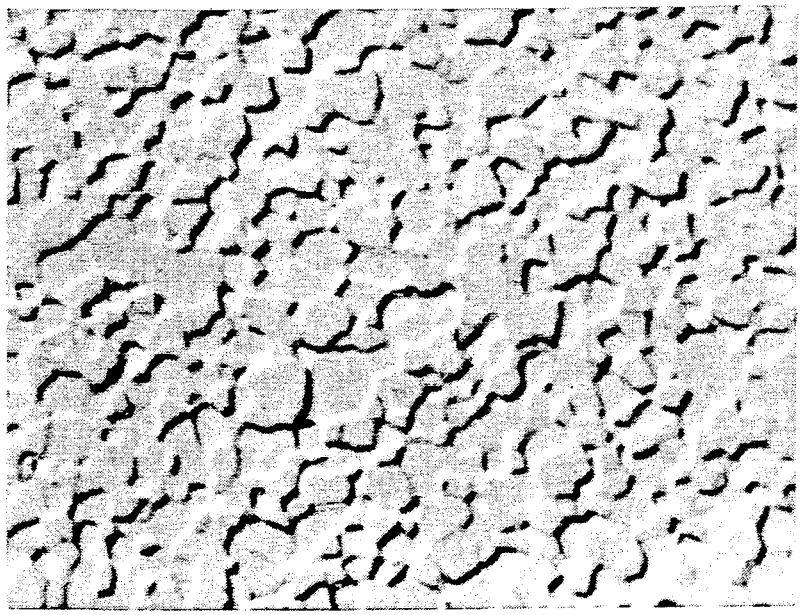
FIG. 9 is a microscopic photograph taken from the bearing surface.

Incidentally, the microscopic photograph of the bearing (or treated) surface of the Example 1 is shown in FIG. 9.

CSS Test 1

The CSS test was conducted by using the heads of the Examples 3 and 4 and the Comparisons 1 and 2.

The disks used in the CSS test are the following hard disk of 3.5 inches:

Substrate: Aluminum;
Surfacing Layer: Cr;
Magnetic Layer: Co-Ni sputtered film;
Surface Layer: Lubricant layer (having a thickness of about 10 to 30 Å) of a fluorine resin applied to the surfaces of the C-sputtered layer and the C-layer; and
Disk Surface Roughness: 400 to 600 Å.

The disk driving conditions for the CSS test were as follows:
Rotating Speed: 3,600 r.p.m.;
Period for One Rotation: 7 secs; and
Stop Time between Rotations: 3 secs.

The static friction coefficient $\mu$ between the head and the disk was measured while the CSS test was being conducted.

The results are shown in FIG. 10, together with the repetition number of the CSS.

The following results can be found from FIG. 10:

The static friction coefficient $\mu$ even after the CSS of one hundred thousands was about 0.6 or less in the Examples 3 and 4, and neither the disk nor the head was abnormal. In the Comparison 1, the head and the disk chattered after the CSS of ten thousands, when they came into contact, and caused failures at the start of the disk rotations after the CSS of forty thousands. In the Comparison 2, the static friction coefficient $\mu$ was low, and both the head and disk surfaces were damaged after the CSS of twenty thousands.

CSS TEST EXAMPLE 2

The testing items were similar to those of the foregoing test except for the use of the following plated disk:
Substrate: Aluminum;
Surfacing Layer: Ni-P;
Magnetic Film: Co-Ni; and
Surface Layer: C and lubricant (identical to that of the Test Example 1).

The results of this CSS test Example are shown in FIG. 11, from which it is found that the results obtainable were similar to those of the test Example 1.

EXAMPLE 5

The slider 12 of the composite type magnetic head 11, as shown in the perspective view of FIG. 3, was made of Mn-Zn polycrystalline ferrite containing 31 mol % of MnO, 16 mol % of ZnO and 53 mol % of $Fe_2O_3$, and its air-bearing surfaces 14 and 15 were mirror-finished to have a surface roughness of 10 to 40 Å. These air-bearing surfaces were sputter-etched for about 15 mins under the same conditions as those of the Example 1. As a result undulations having land and groove differences of about 150 Å were formed along the boundaries of the Mn-Zn ferrite crystals. The CSS resistance properties of the sputtered and plated disks were measured by the use of the magnetic head to reveal that the static friction coefficient $\mu_1$ was about 0.5 to 0.6 even after lapse of the CSS repetition times of one hundred thousands.

EXAMPLE 6

The slider 12 of the composite type magnetic head 11, as shown in the perspective view of FIG. 3, was made of a MnO-NiO nonmagnetic ceramic material having a NaCl crystal structure and containing 58 mol % of MnO, 38 mol % of NiO and 4 mol % of $Al_2O_3$. The resultant air bearing surfaces 14 and 15 were sputter-etched for 15 mins under the same conditions as those of the Example 1. As a result, undulations having the maximum land and groove differences of 180 Å (or 120 Å on an average) were formed along the crystal boundaries of the Mn-Ni nonmagnetic ceramic material. The CSS resistance properties of the sputtered and plated disks were measured by the use of the magnetic head to reveal that the static friction coefficient $\mu_1$ was about about 0.4 to 0.6 even after lapse of the CSS repetition times of one hundred thousands.

What is claimed is:

1. A process for fabricating a magnetic head, comprising the steps of:
    setting a slider of a polycrystalline ceramic material in a sputtering apparatus;
    sputter-etching at least one portion of said slider surface to be opposed to a magnetic recording disk, by generating ionized gases in at least one portion of said opposed slider surface, so that lands and grooves may be formed to have a difference of 50 to 200 Å on an average and a repetition pitch of 5 to 20 microns on an average; and bonding a magnetic core to said slider.

2. A magnetic head fabricating process according to claim 1, wherein said sputter-etching step removes a property-changed layer from the surface of said slider and cleans said slider surface.

3. A magnetic head fabricating process according to claim 1, further comprising the step of masking that portion of the slider surface opposed to said magnetic disk other than a portion thereof to be treated, so that only the portion exposed from the mask may be sputter-etched.

4. A magnetic head fabricating process according to claim 3, further comprising the step of removing said mask during said sputter-etching step to form steps between the masked and exposed portions.

5. A magnetic head fabricating process according to claim 1, wherein said sputter-etching step forms undulations of said lands and said grooves having an amplitude of 50 to 300 Å.

6. A magnetic head fabricating process according to claim 1, wherein the ceramic material composing said slider is spinel type ferrite.

7. A magnetic head fabricating process according to claim 1, wherein the ceramic material composing said slider is Ni-Zn ferrite or Mn-Zn ferrite.

8. A magnetic head fabricating process according to claim 1, wherein the ceramic material composing said slider is an Mn-Ni oxide.

9. A magnetic head fabricating process according to claim 1, wherein the ceramic material composing said slider is calcium titanate, barium titanate, alumina, or zinc ferrite.

10. A magnetic head fabricating process according to claim 1, wherein the lands and grooves are formed to have a difference ob 70 to 170 Å on an average and a repetition pitch of 7 to 17 microns on an average.

11. A magnetic head fabricating process according to claim 1, wherein steep portions are formed between the lands and grooves extending along the boundaries of the ceramic material crystals.

12. A magnetic head fabricating process according to claim 1, further comprising, prior to said sputter-etching step, the step of polishing the slider surface to be opposed to the disk.

13. A magnetic head fabricating process according to claim 12, wherein in the polishing step the slider surface is polished to have a surface roughness of approximately 10 to 40 Å.

14. A magnetic head fabricating process according to claim 13, wherein the undulations extend along the boundaries of the ceramic material crystals.

* * * * *

UNITED STATES PATENT AND TRADEMARK OFFICE
CERTIFICATE OF CORRECTION

PATENT NO. : 5,052,099            Page 1 of 2
DATED : October 1, 1991
INVENTOR(S) : Taguchi et al.

It is certified that error appears in the above-identified patent and that said Letters Patent is hereby corrected as shown below:

Title page: - [63]: change "Continuation-in-part" to --Divisional--.

Col. 1,    line 5, delete "copending";
           line 7, "5,010429" should be --5,010,429--.

Col. 3,    line 7, after "FIG" insert --3--;
           line 8, after "a" (first occurrence) insert --schematic--;
           line 60, "These" should be --The--.

Col. 4,    line 20, "comes" should be --come--.

Col. 6,    line 43, "AND-2" should be --AND 2--.

UNITED STATES PATENT AND TRADEMARK OFFICE
CERTIFICATE OF CORRECTION

PATENT NO. : 5,052,099

DATED : October 1, 1991

INVENTOR(S) : Taguchi et al.

It is certified that error appears in the above-identified patent and that said Letters Patent is hereby corrected as shown below:

```
  Col.7, line 30, "cf" should read --of--.
 Col. 7,    line 31, after "test" insert --,--;
           line 49, after "result" insert --,--.

Col. 8,    line 51, "ob" should be --of--.
```

Signed and Sealed this

Ninth Day of March, 1993

*Attest:*

STEPHEN G. KUNIN

*Attesting Officer*     Acting Commissioner of Patents and Trademarks